(12) United States Patent
Williams et al.

(10) Patent No.: US 7,907,278 B1
(45) Date of Patent: Mar. 15, 2011

(54) STARING IMAGING GRATING SPECTROMETER FOR DETECTION OF PROJECTILES

(76) Inventors: Lowell Williams, Xenia, OH (US); D. Scott Anderson, Champaign, IL (US); Erik J. Thoreson, Huber Heights, OH (US)

( * ) Notice: Subject to any disclaimer, the term of this patent is extended or adjusted under 35 U.S.C. 154(b) by 452 days.

(21) Appl. No.: 11/593,464

(22) Filed: Nov. 6, 2006

(51) Int. Cl.
*G01J 3/28* (2006.01)

(52) U.S. Cl. .......................... 356/328; 356/305; 356/326

(58) Field of Classification Search .................. 356/300, 356/305, 326, 328, 488, 499, 28, 28.5
See application file for complete search history.

(56) References Cited

U.S. PATENT DOCUMENTS

| | | |
|---|---|---|
| 4,178,099 A | 12/1979 | Williams |
| 4,205,229 A | 5/1980 | Frosch et al. |
| 4,270,143 A | 5/1981 | Morris |
| 4,465,940 A | 8/1984 | Graff et al. |
| 4,650,321 A | 3/1987 | Thompson |
| 4,675,532 A | 6/1987 | Carson |
| 5,216,484 A | 6/1993 | Chao et al. |
| 5,300,780 A | 4/1994 | Denney et al. |
| 5,329,595 A | 7/1994 | Davies |
| 5,373,182 A | 12/1994 | Norton |
| 5,479,255 A | 12/1995 | Denney et al. |
| 5,534,697 A | 7/1996 | Creekmore et al. |
| 5,627,905 A | 5/1997 | Sebok et al. |
| 5,850,285 A | 12/1998 | Hill et al. |
| 5,982,497 A | 11/1999 | Hopkins |
| 5,999,652 A | 12/1999 | Bushman |
| 6,018,587 A | 1/2000 | Cabib |
| 6,079,665 A | 6/2000 | Nella et al. |
| 6,157,404 A | 12/2000 | Marshall et al. |
| 6,267,039 B1 | 7/2001 | Czarnecki |
| 6,302,355 B1 | 10/2001 | Sallee et al. |
| 6,369,885 B1 | 4/2002 | Brown et al. |
| 6,518,574 B1 | 2/2003 | Castleman |
| 6,522,403 B2 * | 2/2003 | Wilson et al. .................. 356/328 |
| 6,687,007 B1 | 2/2004 | Meigs |
| 6,958,813 B1 | 10/2005 | Ahmadjian et al. |
| 2007/0017281 A1 | 1/2007 | Rodgers et al. |
| 2007/0182962 A1 * | 8/2007 | Bearman et al. ............... 356/328 |
| 2009/0225314 A1 * | 9/2009 | Warren ......................... 356/328 |

OTHER PUBLICATIONS

P. Arribas et al., "FPGA Implementation of the Horn & Shunk Optical Flow Algorithm for Motion Detection in Real Time Images," *XIII Design of Circuits and Integrated Systems Conference*, Madrid, Spain, Nov. 17-20, 1998, 6 pages.

Koch, Wolfgang, "Target Tracking," *Advanced Signal Processing Handbook*, © 2001, CRC Press LLC, pp. 1, 4-8.

*Track-While-Scan TWS Naval Weapons Systems*, Department of the Navy, Powerpoint presentation, c. 1997-2004.

(Continued)

*Primary Examiner* — Isam Alsomiri
(74) *Attorney, Agent, or Firm* — William F. Bahret

(57) ABSTRACT

A detection system comprising detection processing means, spectral discrimination means, and temporal tracking and declaration processing means which cooperate to detect and declare a missile launch. A spatial filter isolates discrete spectral features in an image from a detector array. The discrete spectral features must pass a threshold, which may be adaptive. In a spectral discrimination step, the pixel-to-pixel separation for those pixels passing the spatial filter step is compared to a predetermined pixel spacing. The predetermined pixel spacing is determined from the optical setup and a spectral feature of interest that is contained within the emission from, for example, an ignited rocket motor or other fired projectile. In a temporal step, the pixels that have met the other criteria are tracked as candidate detections, which are declared a threat if they display characteristics of a moving threat, e.g., a MANPADS missile, RPG, mortar or the like.

8 Claims, 4 Drawing Sheets

OTHER PUBLICATIONS

FAS Military Analysis Network, *Fundamentals of Naval Weapons Systems*, "Chapter 6, Track-While-Scan Concepts," [online], date unknown, [retrieved on Sep. 1, 2005]. Retrieved from the Internet: http://www.fas.org/man/dod-101/navy/docs/fun/part06.htm.

CAT Track, [online], © 1996-2003, [retrieved Apr. 2004]. Retrieved from the Internet—URL unavailable.

RVP Radar Tracking, [online], © 1996-2003, [retrieved Apr. 2004]. Retrieved from the Internet—URL unavailable.

Hartke et al., "Snapshot Dual-Band Visible Hyperspectral Imaging Spectrometer," *Optical Engineering*, Jan. 2007, vol. 46, No. 1, 013201, 7 pages.

Wright et al., "Optical Studies of Combustion Chamber Flame in Hybrid Rocket Motor," *Journal of Pyrotechnics*, Issue 21, Summer 2005, pp. 21-30.

"Optics in defense applications," [online], © 2003-2004 OpticsReport, LLC. Retrieved from the Internet: http://www.opticsreport.com/content/printable.php?id=1009&command=article.

Aikio, Mauri, "Hyperspectral Prism-Grating-Prism Imaging Spectrograph," Espoo [Finland]: Technical Research Centre of Finland, 2001, 125 pgs.

"AVIRIS in a Nutshell," [online], c. 1995, [retrieved Jan. 26, 2010], Jet Propulsion Laboratory. Retrieved from the Internet: http://www.ltid.inpe.br/html/pub/docs/html/aboutAV.htm, 11 pgs.

\* cited by examiner

STARING IMAGING GRATING SPECTROMETER FOR DETECTION OF PROJECTILES

BACKGROUND OF THE INVENTION

This invention relates to electro-optical detection of projectiles and, more particularly, to such detection utilizing wavelengths in the visible to near-infrared (NIR) range.

There is a pressing need for lower cost missile warning systems (MWS) to protect aircraft from air-to-air missiles and surface-to-air missiles. Man-portable air defense systems (MANPADS), e.g., shoulder-fired missiles, are very effective weapons and have been widely proliferated. MANPADs, rocket-propelled grenades (RPGs), and mortars are used in conventional warfare. They are also used in unconventional warfare, such as guerilla warfare or terrorist activities. One example of MANPADS used against a civilian target was the December 2002 terrorist attack on a civilian airliner in Kenya. MANPADS have been proliferated widely to third-world countries and terrorists. The Russian-built SA-7, SA-14, SA-16 and SA-18 missiles, for example, are readily available through the Russian black market and through the cash-poor countries of the former Soviet Union. As these threats are further proliferated, there will be a continued increase in loss of life and aircraft.

Terrorists are using MANPADS to attack civilian aircraft and military aircraft operating out of commercial airports in urban areas, so there is a need for systems capable of operating in high-clutter urban environments. The design problem is made more difficult by the need to provide technologically advanced alternatives at a low cost; preferably the cost would be low enough to allow missile warning systems to be placed onboard all assets as opposed to high value assets.

SUMMARY OF THE INVENTION

The present invention provides a detection system with a staring imaging grating spectrometer comprising a diffraction grating within an optical train that includes optical components and a detector array. The invention is described in detail herein for a missile warning sensor application, but the inventive concept also applies to other projectiles, which term as used herein includes self-propelled and externally propelled bodies such as rocket motors, RPGs, mortars and the like.

The detection system comprises detection processing means, spectral discrimination means, and temporal tracking and declaration processing means, which, in a preferred embodiment, are implemented in software as three steps for detecting and declaring a missile launch. The first step is a spatial step whereby a spatial filter isolates discrete spectral features in the image from the detector array. The discrete spectral features must pass a threshold, which may be adaptive. The second step is a spectral step whereby the pixel-to-pixel separation for those pixels passing the first step is compared to a predetermined pixel spacing. The predetermined pixel spacing is determined from the optical setup and a spectral feature of interest that is contained within the emission from, for example, an ignited rocket motor or other fired projectile. The third step is a temporal step whereby the pixels that have passed the first two steps are tracked as candidate detections. The pixels that pass all three steps are declared a threat if they display characteristics of a moving threat, e.g., a MANPADS missile, RPG, mortar or the like.

The invention advantageously employs a reflection grating or transmission grating to disperse light into individual wavelengths, from which spectral information is obtained for detection of projectile launches. Spectrometer measurements of the plume for solid-fueled rocket motors indicate the presence of two spectral lines (wavelengths) of potassium, 766.49 nm and 769.896 nm, which are typically referred to as the potassium doublet. One preferred embodiment of the invention is designed to detect the potassium doublet. Other embodiments use other observed spectral features for detection. An imaging spectrometer according to the present invention solves problems associated with other spectrometers since it can be made with a large field of regard (FOR), sometimes referred to as field of view (FOV), while still being capable of discriminating the potassium doublet.

The imaging grating spectrometer of the present invention provides a number of advantages over other imagers for missile warning systems, especially with its preferred embodiment which is simple to set up and align, employs only a single camera, which eliminates the need for registration associated with multi-sensor approaches, allows spectral and radiometric information to be extracted, and is inexpensive to build.

A general object of the invention is to provide improvements in missile warning systems.

Other objects and advantages of the present invention will be more apparent upon reading the following detailed description in conjunction with the accompanying drawings.

BRIEF DESCRIPTION OF THE DRAWINGS

FIGS. 7 and 8 are comparison images of a T1 rocket boost at 5 km during the day, with FIG. 8 showing the beneficial effect of a detection algorithm combining a spatial filter with spectral discrimination. Both drawings show two pixels (within an oval) indicative of a potassium doublet, and FIG. 7 also shows clutter in the form of a small scattered boxes outside the oval, while FIG. 8 illustrates the clutter removal due to spectral discrimination.

DETAILED DESCRIPTION OF PREFERRED EMBODIMENTS

Figure 1:
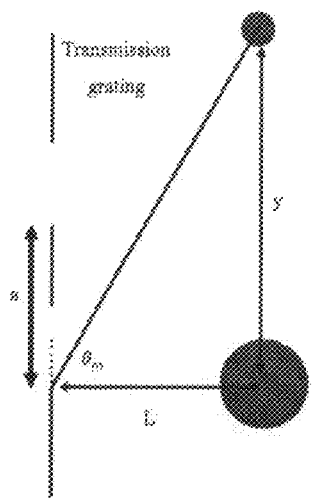
FIG. 1 is a schematic drawing showing the geometric relationship between y, L and $\theta_m$ for a transmission grating described herein.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

An optical grating is an element that can diffract light into individual wavelength components. The amount of separation between wavelengths components is calculated by the grating equation (Eqn. 1.1).

$$m\lambda = a(\sin(\theta_i) + \sin(\theta_m)). \quad (1.1)$$

where m is the order of diffraction, $\lambda$ is the wavelength of light, a is the grating spacing, i.e., the groove spacing in the case of a surface relief grating, $\theta_i$ is the angle of incidence, and $\theta_m$ is the angle of diffraction, both angles being measured with respect to the grating normal. The diffraction grating states that the difference between path lengths is comparable to the groove spacing multiplied by the sine of the incident angle plus the sine of the diffracted angle.

One embodiment of the present invention employs a transmission grating, and one employs a reflection grating. For the former, as described below, the plume from an ignited rocket motor or other fired projectile is treated as a point source at infinity, and the light is accordingly approximated as a plane wave, or as being laterally or spatially coherent. The latter embodiment does not operate under this approximation and instead employs a collimating lens as described below. It will be understood that a collimating lens may also be used with a transmission grating.

However, for the transmission grating with a point source at infinity and on a line normal to the grating, $\theta_i = 0°$, and the grating equation reduces to $$m\lambda = a \sin(\theta_m). \quad (1.2)$$

The integral number of wavelengths is simply related to the grating spacing times the sine of the angle between the zero and the first order maxima.

From FIG. 1, $$\sin(\theta_m) \overset{\theta_m \to small}{\sim} \tan(\theta_m) = \frac{y}{L}, \quad (1.3)$$

Combining Equation (1.3) and (1.2), $$m\lambda = a\sin(\theta_m) \sim a\frac{y}{L} \quad (1.4)$$

where y is the distance (in the image plane) between the zero and first order maxima and L is the distance between the grating and the zero order maxima (or imaging plane). When a lens is placed between the grating and a CCD as in the embodiment described herein, L becomes the focal length of the lens. This equation states that any integral number of wavelengths is equal to the grating spacing times the separation between bright maxima divided by the distance between the grating and image plane.

One aspect of the present invention is the ability to detect the presence of potassium in a spectrum based on the number of pixels between bright spectral points in an image. To determine the number of pixels between spectral lines, the differential of Equation (1.4) must be calculated:

$$md\lambda = a\frac{dy}{L}. \quad (1.5)$$

where $d\lambda$ is the separation between wavelengths and dy is the separation between any two first order diffraction wavelengths.

Figure 4:
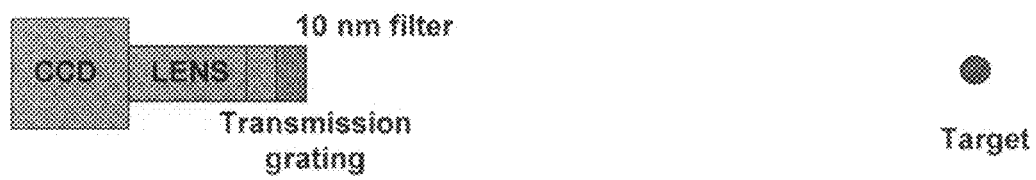
FIG. 4 is a block diagram of one embodiment of a transmission grating instrument according to the present invention, with a drawing of a sample image on a CCD focal plane array (FPA).
Figure 4:
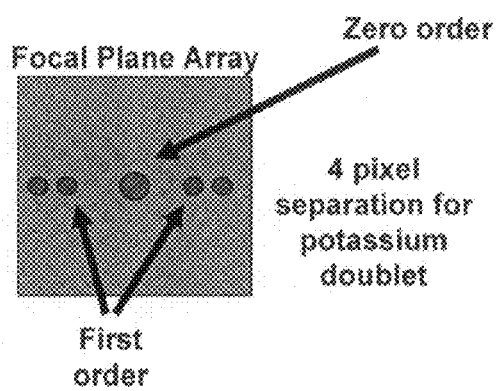

FIG. 4 schematically depicts a preferred form of detection system using a transmission grating, as one example of a system according to the present invention. The disclosed system includes a 10 nm filter centered on 768 nm, a 300 lpmm grating, a lens (with 25 mm nominal focal length and measured focal length of 25.74 mm), and a CCD camera (2048× 2048 array with 7.4 μm pixel size). The light from a scene, including light radiating from a plume for a launched projectile, passes through the filter which blocks those wavelength components that are outside the filter bandwidth, which causes an increase in the temporal or longitudinal coherence of the light incident on the grating. The grating then disperses the remaining light into the individual components of the potassium doublet. The lens collects the light and focuses it onto a detector array such as a CCD focal plane array (FPA). The zero order and two first order potassium doublets are the three components that are imaged onto the CCD or other detector array.

Rearranging Equation (1.5), $$N_p = \frac{dy}{7.4\ \mu m} = d\lambda \frac{L}{a7.4\ \mu m}, \quad (1.6)$$

where 7.4 μm is the pixel pitch, and $N_p$ is the number of pixels between any two wavelengths.

For potassium, $d\lambda = (769.896 - 766.490)$ nm$= 3.406$ nm. Thus, with a equal to 1/300 mm, L equal to 25.74 mm, and the pixel pitch of 7.4 μm, the separation between potassium emission lines is 4 pixels.

Figure 5:
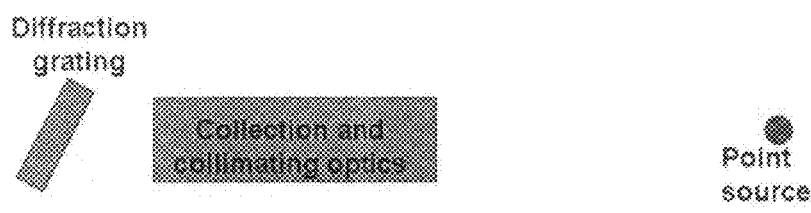
FIG. 5 is a block diagram of one embodiment of a reflection grating instrument according to the present invention, with a drawing of a sample image on a focal plane array. The reflection grating in the disclosed embodiment is tilted such that only the first order maxima (for potassium in this example) lie on the FPA.
Figure 5:
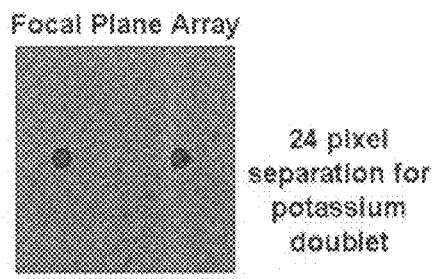
Figure 6:
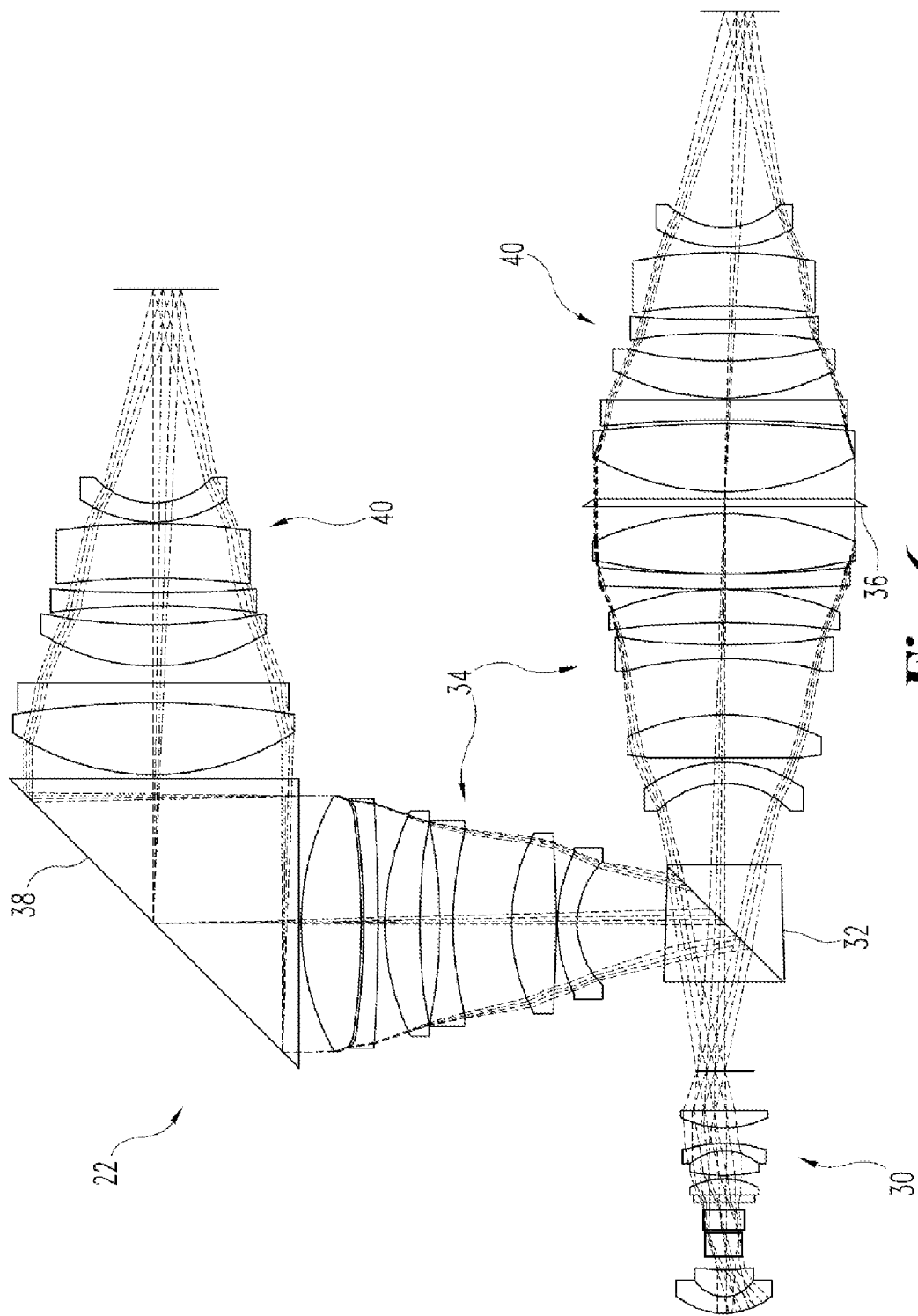
FIG. 6 is a drawing showing details of the optics of an embodiment of a reflection grating instrument according to the present invention.

As depicted in FIG. 5, another embodiment of the present invention employs a reflective diffraction grating between collection and collimating optics and a camera having a lens and a CCD or other FPA. The collection and collimating optics includes a 10 nm trim filter of the type described above (FIG. 4). One prototype instrument employed a modified form of a dual-path imaging lens 22 from ASE Optics, Inc., illustrated in FIG. 6 and further described in co-pending U.S. patent application Ser. No. 10/924,166, filed Aug. 23, 2004 and hereby incorporated by reference in its entirety along with all references cited therein. The prototype utilizes the upper optical path of the modified lens, which includes a front imaging lens 30, a standard 50/50 non-polarizing beam splitter 32, a 10 nm bandwidth filter 36 centered on 768 nm, and a 300 lpmm plane reflection grating 38. The modified lens has a FOR of 30 degrees, and the measured focal length of the system is 338.2 mm. The grating is a blazed reflection grating and is preferably tilted such that the first order maxima (corresponding to the potassium doublet) are substantially aligned with the optical axis of the camera lens.

Figure 2:
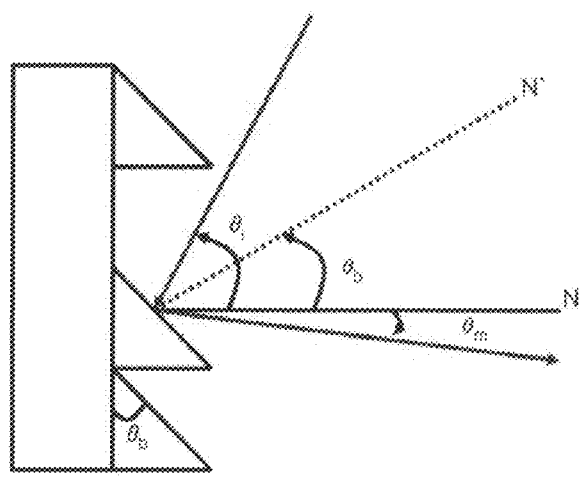
FIG. 2 is a schematic diagram of a reflection grating showing the relationship between $\theta_i$, $\theta_m$, and $\theta_b$.

A blazed reflection grating has grooves that are shaped, so the maximum efficiency is shifted into another order. Referring to FIG. 2, the condition for this blaze angle is $$\theta_b = \frac{\theta_i - \theta_m}{2}. \quad (1.7)$$

Inserting Equation (1.7) into the grating equation (1.1), $$m\lambda = a(\sin(\theta_i) + \sin(2\theta_b - \theta_i)) \quad (1.8)$$

If the reflection grating is tilted so that $\theta_i = \theta_b$, $\theta_m = -\theta_i$, and the grating equation can be recast into $$m\lambda = a(\sin(\theta_b) + \sin(2\theta_b - \theta_b)) = 2a(\sin(\theta_b) = 2a|\sin(\theta_m)|. \quad (1.9)$$

In the limit as $\theta_i$ or $\theta_b$ is small, $$m\lambda = 2a\frac{y}{L} \quad (1.10)$$

and the differential is $$d\lambda = \frac{2a}{m}\frac{dy}{L}. \quad (1.11)$$

Figure 3:
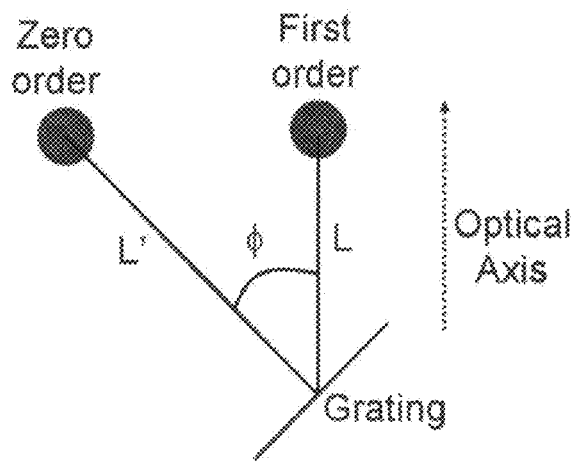
FIG. 3 is a schematic diagram showing the increased distance between the grating and the CCD or image plane when the first order maxima are aligned with the optical axis of the reflection grating instrument.

When the reflection grating is tilted as depicted in FIG. 3, the zero and first order maxima are refracted and diffracted at an angle, which makes the effective distance between the grating and zero order maxima larger by a factor of $1/\cos(\phi)$. Modifying Equation (1.10) and (1.11) accordingly, $$m\lambda = 2a\frac{y}{L}\cos(\phi) \quad (1.12)$$

and $$d\lambda = \frac{2a}{m}\frac{dy}{L}\cos(\phi) \quad (1.13)$$

where $\phi$ accounts for the angle that the reflection grating is tilted, dy is the spectral length of one pixel, L is the distance between the grating and the zero order maxima, and a is the grating spacing. Equation (1.12) and (1.13) now correctly accounts for the position of the first order maxima.

The blazed reflection grating in the disclosed embodiment is preferably tilted 10.354° (angle $\phi$). With this angle and with dy=7.4 μm, L=338.2 mm, and a=1/300 mm, there is a 24-pixel separation for the potassium doublet.

Summarizing, two different types of diffraction grating instruments are disclosed herein, one with a transmission grating (300 lpmm) in front of a lens attached to a CCD camera (or other FPA), and the second with a reflection grating. With the transmission grating, light (a plume from a fired projectile is assumed to be a point source at infinity) is filtered, dispersed, collected, and focused on the CCD camera. With the reflection grating, the light is collected, collimated, dispersed, filtered, and then focused onto the CCD camera.

One preferred type of grating is a volume phase holographic (VPH) grating. Such gratings provide greater diffraction efficiency among other advantages. In cases where missile brightness is almost equal with the background, a VPH grating may help minimize the background while still transmitting most of the missile's intensity.

The preferred embodiment of the present invention is a real-time system employing a detection algorithm which includes a 9×9 spatial filter. The spatial filter may be implemented as a 9×9 kernel, or array of pixels, with the central 5×5 array of pixels treated as a signal box, and the surrounding 56 pixels (effectively a 2-pixel-wide donut) treated as a background box. The mean and standard deviation of the intensity values for the 56 pixels of the background box are calculated as follows:

$$\text{Mean} = \left[\sum_{n=0}^{n=55} P(n)\right] \bigg/ 56$$

$$SD = \sqrt{\left[\left(\sum_{n=0}^{n=55} [\text{Mean} - P(n)]^2\right) \bigg/ 56\right]}$$

A 9×9 kernel is formed around each pixel in the image from the detector array, and, for each kernel, the Z score of the center pixel is calculated as follows:

Z score=$(P_c-\text{Mean})/SD$ where $P_c$ is the intensity value for the center pixel. That is, the Z score is the deviation of the value of a given pixel from the mean value of the 56 outer pixels in the corresponding kernel, normalized by the standard deviation of those outer pixels. The Z score calculation for a given pixel may be based on the deviation of that pixel alone or may include one or more neighboring pixels, e.g., the mean or a weighted sum of selected pixels or all pixels in the signal box.

The Z score is calculated for each pixel in the image and compared to a defined threshold which is expressed in units of standard deviations ($\sigma$). The threshold is preferably an adaptive threshold, adjusted incrementally so as to limit the number of candidate detections to a desired level, e.g., approximately twenty detections per frame of the image. From an initial threshold of 10$\sigma$ for the spatial filter, for example, the processor may be programmed to reduce the threshold by 0.1$\sigma$ after each frame for which there are more than twenty candidate detections. A corresponding increase in the threshold may likewise be provided for cases where the number of candidate detections is lower than an expected level for a particular application or particular operating conditions. In addition, the threshold adjustment may be limited, e.g., to a range of ±1$\sigma$ around a nominal value. Further details of suitable detection processing steps are disclosed in co-pending U.S. patent application Ser. No. 10/924,166.

Figure 7:
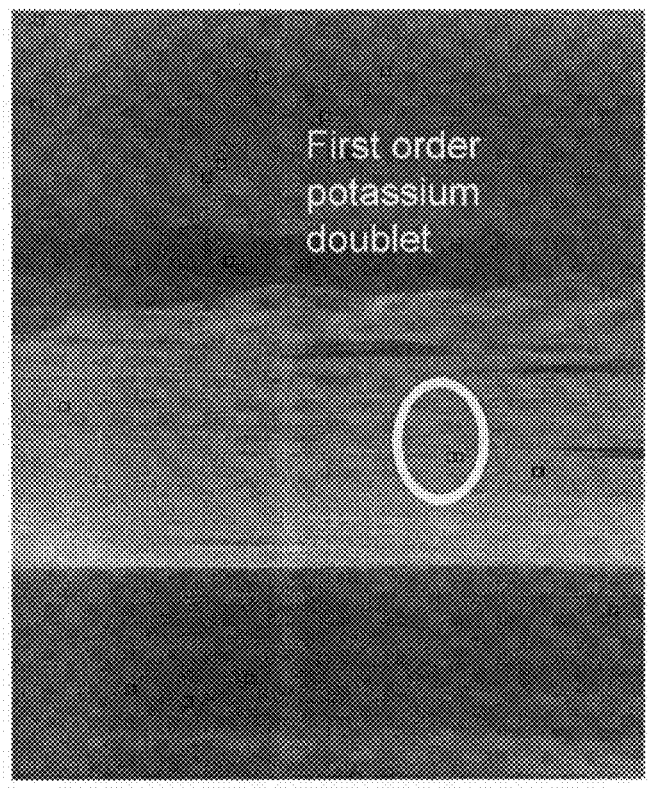
Figure 8:
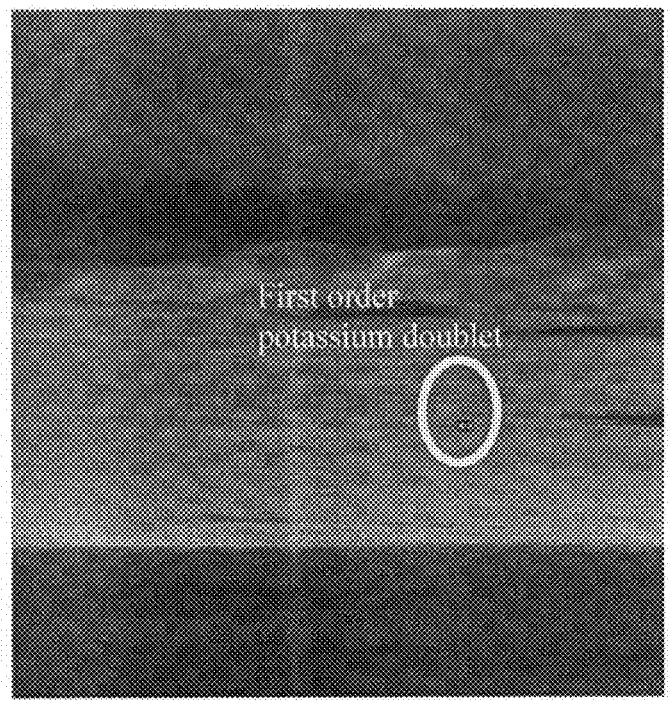

In addition to a spatial filter with a 9×9 spatial algorithm as described above, the preferred embodiment of the present invention includes spectral discrimination, i.e., the capability of discriminating among pixels on the basis of inter-pixel spacing. The processor is advantageously programmed to detect pixels above a threshold that are separated by a predetermined pixel spacing. In the application involving detection of the potassium doublet, only those detections that are four pixels apart are included in a modified detection overlay. The 9×9 spatial algorithm has been tested with and without such spectral discrimination during the boost phase for a T1 missile launched during the day at 5 km range, with data taken with the transmission grating embodiment described above. FIG. 7 shows a cropped portion of a sample processed image from a test using the 9×9 spatial algorithm without spectral discrimination, whereas FIG. 8 shows a comparison image obtained with the spatial algorithm and with spectral discrimination for the potassium doublet. FIG. 7 shows clutter in the form of a number of black boxes (representing the detection overlay) outside the oval marking the potassium doublet, and the absence of those boxes in the FIG. 8 image illustrates the clutter suppression provided by the spectral discrimination, for the same threshold, as described above. The comparison test indicates that discriminating for the potassium doublet significantly reduces the number of false alarms.

The present invention addresses important missile warning issues and, among its various aspects, provides significant improvements in terms of, for example, 1) a reduction in the number of false alarms due to clutter, 2) improved ability to determine missile location, and 3) cost reduction for a missile warning sensor. Uniform sources, i.e., broadband sources such as white light, do not produce distinct spectral lines, and, along with extended sources, i.e., large sources, are discriminated against by the preferred embodiment of the present invention, which thereby limits the analysis to those light source points that are small and have longitudinal and lateral coherence. By discriminating for distinct spectral lines, the invention provides orders of magnitude of reduction in the clutter crossing rate over that experienced with single spectral line detection. In a preferred embodiment, to discriminate a missile from other sources, the distance between the lines of a potassium doublet and the distance from the zero order will discriminate against those sources that are not potassium-based. This technique combined with software that allows the motion of the source to be included in the detection/declaration process can further decrease false alarms by discriminating between stationary objects and moving targets which represent a threat. Optical flow algorithms such as described in co-pending U.S. patent application Ser. No. 10/924,166 and the references cited therein, which are hereby incorporated by reference, are examples of such software. The location of the missile can be determined by observing the zero order and the first order spectra on the FPA, and using that data to measure the location of the missile firing and direction of traversal. A cost reduction for a missile warning sensor is expected because the staring imaging grating spectrometer disclosed herein is a simple device and relatively inexpensive to set up.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

We claim:

1. A detection system with a staring imaging grating spectrometer, comprising:
   a diffraction grating;
   a staring detector array in optical alignment with said diffraction grating;
   a lens mounted between and in optical alignment with said diffraction grating and said staring detector array;
   wherein said detector array has a two-dimensional array of pixels exposed substantially simultaneously to incoming light from a distant object and, in conjunction with said diffraction grating, produces a two-dimensional image with spectral information combined with spatial information in at least one dimension;
   detection processing means, coupled to said staring detector array, including a spatial filter for isolating discrete spectral features in the image from said detector array, and threshold detection means for detecting among said discrete spectral features the pixels having an intensity above a threshold;
   spectral discrimination means for discriminating among the pixels above said threshold on the basis of inter-pixel spacing, said spectral discrimination means detecting pixels above said threshold that are separated by a predetermined pixel spacing; and
   temporal tracking and declaration processing means including means for tracking the pixels with said predetermined pixel spacing as candidate detections, and means for identifying a candidate detection as a threat if it persists and has defined characteristics of moving projectile.

2. The detection system of claim 1, wherein said diffraction grating is a transmission grating.

3. The detection system of claim 1, wherein said diffraction grating is a reflection grating.

4. The detection system of claim 2, further comprising a narrowband filter positioned in front of said diffraction grating in the path of incoming light.

5. The detection system of claim 4, wherein said predetermined pixel spacing corresponds to spectral features contained within spectra emitted from a plume of a fired projectile.

6. The detection system of claim 5, wherein said spectral features include a plurality of distinct spectral lines.

7. The detection system of claim 5, wherein said predetermined pixel spacing corresponds to a potassium doublet.

8. The detection system of claim 1, wherein said system is adapted to exclude uniform extended sources, and track only light source points that are small and have longitudinal and lateral coherence.

* * * * *